United States Patent [19]

Leemhuis

[11] 4,108,371
[45] Aug. 22, 1978

[54] DAMPER CONTROL DEVICE

[76] Inventor: Louis J. Leemhuis, 1855 Sherington Pl. Apt. M214, Newport Beach, Calif. 92663

[21] Appl. No.: 749,160

[22] Filed: Dec. 9, 1976

[51] Int. Cl.² .................. F16K 31/12; F24F 11/04
[52] U.S. Cl. .................................... 236/49; 137/499; 236/80 E
[58] Field of Search .............. 236/49, 80 R, 80 E; 137/486, 499; 251/31

[56] References Cited

U.S. PATENT DOCUMENTS

| | | | |
|---|---|---|---|
| 1,466,412 | 8/1923 | Samain | 137/499 X |
| 2,812,774 | 11/1957 | Anderson et al. | 251/31 X |
| 3,402,889 | 9/1968 | Willson | 236/80 F |
| 3,511,267 | 5/1970 | Stonich | 137/486 |
| 3,719,321 | 3/1973 | McNabney | 236/49 |

Primary Examiner—William E. Wayner
Attorney, Agent, or Firm—Poms, Smith, Lande & Glenny

[57] ABSTRACT

A variable value, constant volume fluid flow control device has damper means for regulating fluid flow through a conduit to a zone and damper control means for regulating the damper means comprising fluid supply means for diverting a portion of the fluid flow being controlled to the damper control means, transducer means having a first and a second chamber and being responsive to pressure differentials between the first and second chambers for moving the damper means, means for directing the portion of fluid flow to the first and second chambers, vent means for selectively venting either of the first and second chambers and vane means responsive to fluid flow velocity within the conduit for operating the vent means to operate the transducer means. Bias means are provided for biasing the vane means against a direction of the fluid flow through the conduit such that the vane means returns to a neutral position under conditions of optimum fluid flow velocity. Adjustable means are provided for calibrating the sensitivity of the vane means at an initial value relative to an optimum fluid flow velocity through the conduit. Temperature responsive means are provided for varying the value of the sensitivity of the bias means from an initial value in response to changes in temperature within the zone to which the fluid flow is being provided.

14 Claims, 3 Drawing Figures

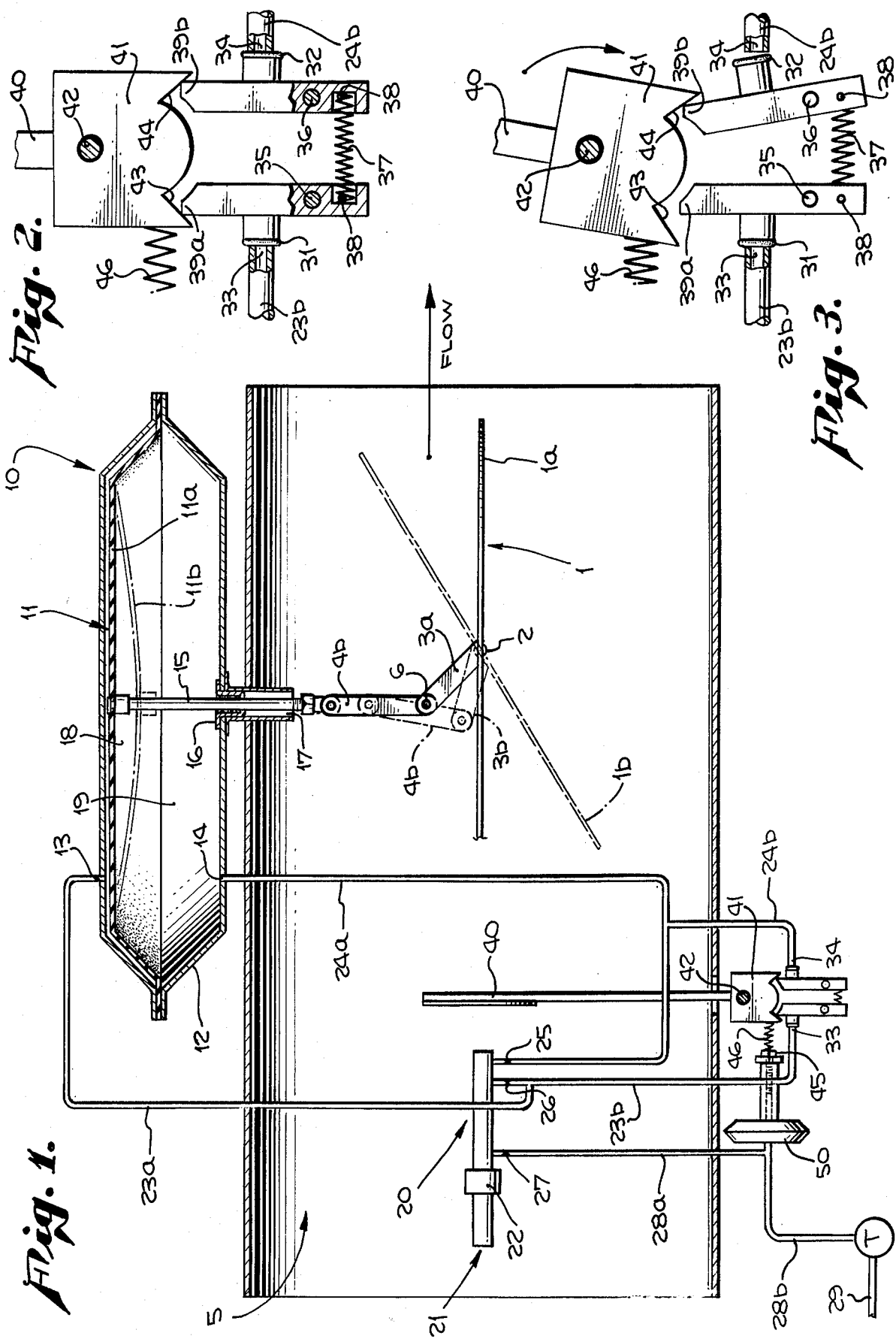

4,108,371

DAMPER CONTROL DEVICE

BACKGROUND OF THE INVENTION

The present invention relates, in general, to constant volume fluid flow control devices for fluid conduits which supply fluid to a zone. In particular, the present invention relates to devices which utilize damper means for regulating fluid flow through the conduit to the zone and, specifically, relates to damper control means for regulating the damper.

Heretofore, the problem of providing a damper control in order to maintain a zone at a desired temperature has been solved by utilizing an external energy source to operate the damper control device. Exemplary of such systems is my co-pending Application for U.S. Letters Patent, Ser. No. 711,066 which utilizes compressed air from an external source or electricity to operate the damper control mechanism.

It has been found in these prior embodiments that the utilization of an external energy source is a complex, expensive approach to solving the problem of operating the damper control mechanism. Further, due to the complexity of these prior art approaches, there is a higher potential for failure of the damper control device than would be present in a more simplified system. Finally, the prior art approaches to the problem of damper control device operation which rely on an external energy source are potentially capable of providing uncontrolled fluid flow through the conduit to the zone should said external energy source fail while fluid is flowing through the conduit.

SUMMARY OF THE INVENTION

It is therefore a primary object of the present invention to disclose and provide an improved damper control device of a simplified construction, which is economical to manufacture, reliablle in operation, and capable of properly supplying fluid to the zone in a uniform manner and, at the same time, eliminate the potential for failure of the damper control device while fluid is flowing through the conduit due to the failure of an external energy source.

Generally stated, the present invention in an improved damper control device includes the provision of fluid supply means for diverting a portion of the fluid flow being controlled to the damper control means. Transducer means having a first and second chamber and being responsive to a pressure differential between the first and second chambers are provided for moving the damper means. Means are provided for directing the portion of the fluid flow to the first and second chambers. Vane means which are responsive to fluid flow velocity within the conduit operate the vent means and thereby, operate the transducer means. Adjustable bias means calibrate the sensitivity of the vane means at an initial value relative to an optimum fluid flow velocity through the conduit and temperature responsive means vary the value of the sensitivity of the bias means from an initial value in response to changes in temperature within the zone to which the fluid flow is being provided.

A more complete understanding of the improvements in damper control devices in accordance with the present invention, as well as the recognition of additional objects and advantages therefor, will be afforded to those skilled in the art from a consideration of the following detailed description of an exemplary embodiment thereof. Reference will be made to the appended sheet of drawings which will first be discussed briefly.

BRIEF DESCRIPTION OF THE DRAWINGS:

FIG. 1 is a sectional view of a fluid conduit showing the damper means for regulating fluid flow through the conduit and the damper control means of the present invention which regulates the damper means.

FIG. 2 is a partial side sectional detailed view showing the relationship between the vent means for selectively venting the damper control device of the present invention and vane means responsive to fluid velocity within the conduit which operates the vent means, when the vane means in in a central/neutral position under conditions of optimum fluid flow velocity.

FIG. 3 is a detail view, as in FIG. 2, showing the relationship between the vent means and the vane means under conditions of high fluid flow velocity through the conduit.

DETAILED DESCRIPTION OF AN EXEMPLARY EMBODIMENT:

Referring first to FIG. 1, a variable value, constant volume fluid flow control device for controlling the volume of fluid flow through a conduit 5 is shown. The device comprises damper means 1, shown in positions 1a and 1b, for regulating fluid flow through conduit 5 to a zone. Damper control means for regulating damper means 1 is also shown.

The damper control means of the present invention has fluid supply means, shown generally at 20, having an inlet 21, check valve 22, and fluid conduits 23a, 23b, 24a, 24b, 28a and 28b. Fluid supply means 20 diverts a portion of the fluid flow being controlled from within conduit 5 to the damper control device of the present invention.

The damper control means of the present invention, as shown in the present exemplary embodiment, has transducer means shown generally at 10 for moving damper means 1 shown in positions 1a and 1b. Transducer means 10 has a first chamber 18 and a second chamber 19 and is responsive to a pressure differential between first chamber 18 and second chamber 19. Diaphragm means 11, shown in positions 11a and 11b, separates a fluid-tight diaphragm housing 12 into a first chamber 18 and a second chamber 19. The diaphragm is operationally interconnected to damper means 1 by a linkage mechanism which includes connector shaft 15 and seal 16 which are associated with the diaphragm 11, and damper shaft 4, damper crank 3, and damper pivot 2 which are associated with damper 1.

Means are provided for directing a portion of the fluid flow through conduit 5 to first chamber 18 and second chamber 19. First conduit means 23a which includes a first fluid port 13 within diaphragm housing 12 connects first chamber 18 with fluid supply means 20. Second conduit means 24a which includes a second fluid port 14, connects second chamber 19 with fluid supply means 20. Thus, it can be seen that fluid is directed, by means of conduits 23a and 24a through fluid ports 13 and 14, respectively, to opposite sides of diaphragm 11 within diaphragm housing 12.

As may be seen in FIG. 1, when vane means 40 is in a neutral position, fluid supply means 20 and the conduits attached thereto, 23a, 23b, 24a, and 24b, form an essentially closed system wherein the fluid pressure is constant at all points. Thus, in order for a pressure differential to exist on opposite sides of diaphragm 11 within diaphragm housing 12, first chamber 18 and second chamber 19 are provided with means for selectively venting one of these chambers which are separated by diaphragm 11. This will provide a desired relative fluid pressure differential between the two chambers and allow diaphragm means 11 to move under the influence of the pressure differential.

In order to provide for the selective venting of first chamber 18 annd second chamber 19, bleed port means 33 and 34, respectively, are provided. Additionally, in order to prevent damage to the damper control system, safety restrictor means 25, 26, and 27 are provided at an inlet to each of the conduits associated with fluid supply means 20, each of which restrictors has a cross-sectional area smaller than each of the bleed ports 33 and 34. In providing an effective cross-sectional area at an inlet to each conduit associated with the fluid supply means which is smaller than the bleed port associated with that conduit, effective venting of the system is assured. As shown in FIGS. 1, 2, and 3, first fluid port 13 connects first chamber 18 to fluid supply conduit 23a which is, in turn, connected to vent conduit 24b which terminates at bleed port 34.

As is shown in FIG. 3, when bleed port seat 32 is forced away from bleed port 34, vent conduit 24b is open and any fluid within vent conduit 24b and second chamber 19 will be allowed to escape as long as port seat 32 is away from bleed port 34.

Vane means 40, which responds to fluid flow velocity within conduit 5, operates the vent means for selectively venting either the first chamber 18 or the second chamber 19 to operate transducer means 10.

As may be seen in FIGS. 1 and 3, vane 40 is connected to rotatable member 41 which is mounted on pivot 42. Under conditions of high fluid flow velocity, vane 40 is urged in the direction of fluid flow, as shown by the arrow in FIG. 1, thereby rotating rotatable member 41 as is shown in FIG. 3. Upon rotation, second cam surface 44 forces second cam follower 39 in the direction shown. Port seat 32 pivots about port seat pivot 36 thereby opening bleed port 34 and venting conduit 24b. As may be readily seen, this action vents second chamber 19 for so long as the condition of high flow velocity through conduit 5 exists.

As is shown in FIG. 1, by means of the letters a and b which are associated with diaphragm 11, damper crank 3, damper shaft 4, and damper 1, movement of diaphragm 11 from position 11a to position 11b under the influence of fluid pressure differentials between first chamber 18 and second chamber 19 as second chamber 19 is vented, will result in a longitudinal movement of connector shaft 15 through fluid-tight seal 16 slideably mounted to connector shaft 15 and housing aperture 17 which will, in turn, cause a generally longitudinal movement of damper shaft 4. For example, as diaphragm 11 moves from position 11a to 11b, the damper shaft moves from position 4a to position 4b. Damper crank 3 which is attached to damper 1, and which interconnects with damper shaft 4 at pivot 6, is rotated from position 3a to position 3b, which, in turn, results in a rotation of damper 1 about damper pivot 2 from position 1a to position 1b.

The rotation of damper 1 to position 1b effectively reduces the cross-sectional area of the free flow path through conduit 5 and reduces the fluid flow velocity at vane 40. As the velocity is reduced to a level approaching an optimum value, vane 40 is returned to a more neutral position by bias means 46 and bleed port seat 32 returns to a closed position against bleed port 34 to once again seal vent conduit 24b. This will stabilize diaphragm 11 at position 11b by equalizing the fluid pressures between chambers 18 and 19. As was discussed prior, and is shown in FIGS. 1, 2, and 3, a rotatable member 41 is associated with vane means 40. Rotatable member 41 is provided with a first cam surface 43 and a second cam surface 44 for operating bleed port seat 31 and bleed port seat 32 which open and close bleed port 33 and bleed port 34 associated with first chamber 18 and second chamber 19, respectively.

In the exemplary embodiment of the present invention, bleed port seats 31 and 32 are individual members, independently pivoted about pivots 35 and 36, respectively. Bleed port seats 31 and 32 are independently responsive to first cam surface 43 and second cam surface 44, respectively. Bleed port seats 31 and 32 are, therefore, capable of selectively sealing and venting bleed ports 33 and 34, respectively, independently of each other, and thereby selectively venting first chamber 18 and second chamber 19 in response to vane means 40. In the exemplary embodiment, an extended bias spring 37 interconnects bleed port seat 31 with bleed port seat 31. The bleed port seats are generally urged into a closed position by spring 37. Thus, it may be seen that bleed ports 33 and 34 are selectively individually opened and vented by either first cam surface 43 overcoming the force of bias spring 37 and thereby moving bleed port seat 31, or second cam surface 44 overcoming bias spring 37 and moving bleed port seat 32.

Additionally, due to the influence of bias spring 37, as either bleed port seat 31 or bleed port seat 32 is moved toward an open/vented position, the biasing force of spring 37 is increased and the opposing bleed port seat is more firmly forced into a closed/non-vented position.

Bias means 46 are provided for biasing vane means 40 against a direction of fluid flow through conduit 5 such that vane means 40 returns to a neutral position, as shown in FIGS. 1 and 2, under conditions of optimum fluid flow velocity.

In practice, the force produced by an optimum fluid flow velocity of a fluid of known density against vane means 40 having a known cross-sectional area exposed to the fluid flow through conduit 5 and the biasing force supplied by bias means 46 are balanced to produce a "no control" condition within the damper control device under the optimum conditions of fluid flow.

Adjustable means 45 are provided for calibrating the sensitivity of vane means 40 at an initial value relative to an optimum fluid flow velocity through conduit 5 by increasing or decreasing the biasing force provided by biasing means 46. In the exemplary embodiment of the present invention, an increase in biasing force at 46 will require a resultant increase in fluid flow velocity through conduit 5 in order to move vane means 40 from a neutral position. Thus, the sensitivity of vane means 40 to minor changes in fluid flow velocity is markedly decreased. Further, by selecitvley pre-setting adjustable means 45, the damper control device of the present invention may be made to operate effectively within fluid flows having widely varying velocities and also to control the flow of fluids having different densities. This flexibility in applications for which the damper control device of the present invention is suited is a further advantage of the present embodiment.

In the exemplary embodiment of the present invention, as shown best in FIG. 1, the adjustable means for calibrating the sensitivity of vane means 40 consists of lead screw 45 which acts upon bias spring 46 to change the rate of bias spring 46 and thereby vary the force being exerted upon rotatable member 41. In thus changing the bias force exerted by bias spring 46, the sensitivity of vane means 40 to variations in fluid flow velocity within conduit 5 is also varied.

Temperature responsive means are provided, as shown in FIG. 1, for varying the value of the sensitivity of bias means 46 from the innitial value in response to changes in temperature within the zone to which the fluid flow is being provided. In the exemplary embodiment of the present invention, the temperature responsive means, comprising thermostatic means shown generally at T and second actuator means shown generally at 50, act upon lead screw 45 to change the rate of bias spring 46 in response to changes in temperature within the zone to which the fluid flow is being provided and, in a sense, override the selective, pre-set manual adjustment of lead screw 45.

The secondary actuator 50 has a fluid port connected to fluid supply means 20 via conduit 28a and restrictor means 27. A diaphragm (not shown) within secondary actuator 50 responds to variations in fluid pressure within secondary actuator 50 and connector means (not shown) within secondary actuator 50 transmit movement of the diaphragm to movement of lead screw 45. Thermostatically controlled bleed port means 29 connected to secondary actuator means 50 via conduit 28b regulate fluid pressure against the diaphragm within secondary actuator means 50 by controlling bleed port 29.

As was discussed prior with respect to transducer means 10, variations in pressure on opposite sides of a diaphragm result in a linear axial movement of the diaphragm. In operationally interconnecting lead screw 45 with the diaphragm of secondary actuator 50, any linear motion of the diaphragm is transmitted to bias spring 46 and the rate of bias spring 46 is changed.

Thus, it may be seen that once an initial optimum fluid flow volume and a fluid velocity attendant thereby through conduit 5 has been established, an appropriate biasing force against vane means 40 may be selected which will allow vane means 40 to response to deviations in fluid flow velocity through conduit 5. By regulating the relative fluid pressure between first chamber 18 and second chamber 19 on opposite sides of diaphragm 11, the operation of damper 1 may be controlled to provide a uniform constant volume flow through conduit 5. Additionally, should variations in temperature occur within the zone to which fluid is being supplied, temperature responsive means override the preselected adjustments of bias force acting on vane means 40 thereby allowing the damper control means to vary the volume of fluid flow through the conduit to the zone in response to temperature changes within the zone.

Having thus described an exemplary embodiment of improved damper control means for a variable value constant volume fluid flow control device for controlling the volume of fluid flow through a conduit to a zone, it should be understood by those skilled in the art that various alternatives and modifications may be made within the scope and spirit of the present invention which is defined by the following claims.

I claim:

1. In a fluid flow control device for controlling the volume of fluid flow through a conduit to a zone, said device comprising damper means for regulating fluid flow through said conduit to said zone and damper control means for regulating said damper means, the improvement in said damper control means comprising:

fluid supply means including tube means in said conduit facing into said fluid flow for receiving and diverting a portion of said fluid flow in said conduit:

transducer means including first and second pressure chambers devided by a movable diaphragm means for moving said damper means in response to movement of said diaphragm means;

means for deviding and directing said portion of said fluid flow to said first and second chambers to apply the same fluid pressure of said fluid flow to opposite sides of said diaphragm means;

vent means for selectively venting either of said first and second chambers; and vane means including a vane member in said conduit responsive to fluid flow within said conduit and connected to said vent means for operating said vent means to selectively vent either of said first and second chamber to operate said damper means in response to fluid flow in said conduit whereby a constant volume fluid flow can be maintained in said conduit with said device being operated by said portion of said fluid flow diverted from said conduit and said vane means.

2. In the damper control means of claim 1, the improvement comprising the provision of:

biasing means for biasing said vane means to a neutral position relative said vent means corresponding to a selected value of constant volume fluid flow and means for calibrating the sensitivity of said vane means at an initial value relative to an optimum fluid flow volume through said conduit.

3. In the damper control means of claim 2, the improvement comprising the provision of:

temperature responsive means in said zone for varying the value of said sensitivity of said vane means from said initial value in response to changes in temperatures within said zone to which said fluid flow is being provided.

4. In a variable value, constant volume, fluid flow control device for controlling the volume of fluid flow through a conduit to a zone, said device comprising damper means for regulating fluid flow through said conduit to said zome and damper control means for regulating said damper means, the improvement in said damper control means comprising:

fluid supply means for diverting a portion of said fluid flow being controlled to said damper control means;

transducer means for moving said damper means, said transducer means having a first and a second chamber and being responsive to a pressure differential between said first and second chambers;

means for directing said portion of said fluid flow to said first and second chambers;

vent means for selectively venting either of said first and second chambers; and vane means responsive to fluid flow velocity within said conduit for operating said vent means to operate said transducer means.

5. In the damper control means of claim 4, the improvement in vane means comprising:

bias means for biasing said vane means against a direction of fluid flow through said conduit such that said vane means returns to a neutral position under conditions of optimum fluid flow.

6. In the damper control means of claim 5, the improvement in bias means comprising:
adjustable means for calibrating the sensitivity of said bias means at an initial value relative to an optimum fluid flow velocity through said conduit.

7. In the damper control means of claim 4, the improvement venting means comprising:
bleed port means associated with and responsive to said venting means for selectively venting fluid from either of said first and second chambers and safety restrictor means at an inlet to said fluid supply means having a cross-sectional area smaller than said bleed port means for preventing damage to said damper control means.

8. In a variable value, constant volume, fluid flow control device for controlling the volume of fluid flow through a conduit to a zone, said device comprising damper means for regulating fluid flow through said conduit to said zone and damper control means for regulating said damper means, the improvement in said damper control means comprising:
fluid supply means for diverting a portion of said fluid flow being controlled to said damper comtrol means;
transducer means for moving said damper means, said transducer means having a first and second chamber and being responsive to a pressure differential between said first and second chambers;
means for directing said portion of said fluid flow to said first and second chambers;
vent means for selectively venting either of said first and second chambers, said vent means comprising the provision of a rotatable member associated with said vane means having first and second cam surface means for operating bleed port means associated with said first and second chambers respectively; and
vane means responsive to fluid flow velocity within said conduit for operating said vent means to operate said transducer means.

9. In the damper control means of claim 8, the improvement in venting means comprising:
individual, independently pivoted first and second seat means independently responsive to said first and second cam surface means for selectively sealing and venting bleed port means associated with said first and second chambers respectively.

10. In the damper control means of claim 9, the improvement in said seat means comprising:
bias means interconnecting said seat means for urging said seat means into a closed position, said bias means being overcome by said first and second cam surface means to selectively open and vent said bleed port means.

11. In the damper control means of claim 10, the improvement in adjustable bias means comprising:
lead screw means acting upon a bias spring to change the rate of said bias spring and recalibrate said sensitivity of said vane means.

12. In the damper control means of claim 11, the improvement in adjustable bias means comprising:
temperature responsive means for varying the value of said sensitivity of said adjustable bias means from said initial value in response to changes in temperature within said zone to which said fluid flow is being provided.

13. In the damper control means of claim 12, the improvement in temperature responsive means comprising:
secondary actuator means acting upon said lead screw means for changing the rate of said bias spring in response to changes in temperature within said zone to which said fluid flow is being provided, said secondary actuator means having a fluid port connected to said fluid supply means, diaphragm means for responding to variations in fluid pressure, connector means for connecting said diaphragm means to said lead screw means and thermostatically controlled bleed port means for regulating said fluid pressure against said diaphragm means.

14. In a variable value, constant volume, fluid flow control device for controlling the volume of fluid flow through a conduit to a zone, said device comprising damper means for regulating fluid flow through said conduit to said zone and damper control means for regulating said damper means, the improvement in said damper control means comprising:
fluid supply means for diverting a portion of said fluid flow being controlled to said damper control means;
transducer means for moving said damper means, said transducer means having a first and a second chamber and being responsive to a pressure differential between said first and second chambers;
means for directing said portion of said fluid flow to said first and second chambers;
vent means for selectively venting either of said first and second chambers; and
vane means responsive to fluid flow velocity within said conduit for operating said vent means to operate said transducer means, said vane means comprising bias means for biasing said vane means at an initial value against a direction of fluid flow through said conduit such that said vane means returns to a neutral position under conditions of optimum fluid flow velocity, said bias means comprising:
temperature responsive means for varying the bias of said bias means from said initial value in response to changes in temperature within said zone to which said fluid flow is being provided.

* * * * *